Dec. 19, 1967   T. PATRIGNANI   3,358,524
TRANSMISSION DEVICE
Filed July 6, 1966   2 Sheets-Sheet 1
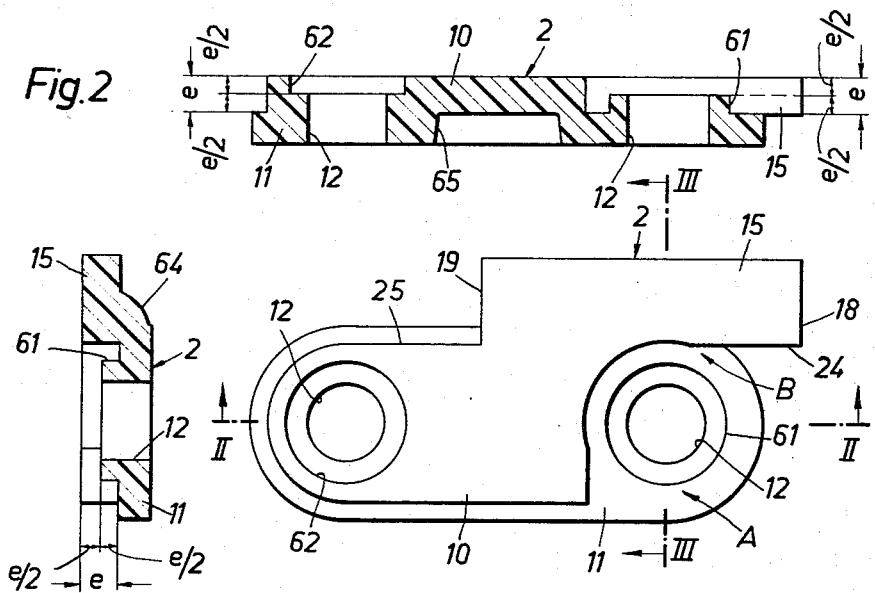
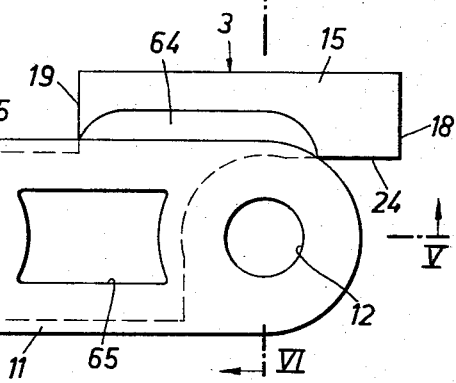
Inventor:
Theo PATRIGNANI
by: Arthur O. Klein
his Attorney Dec. 19, 1967  T. PATRIGNANI  3,358,524
TRANSMISSION DEVICE
Filed July 6, 1966  2 Sheets-Sheet 2
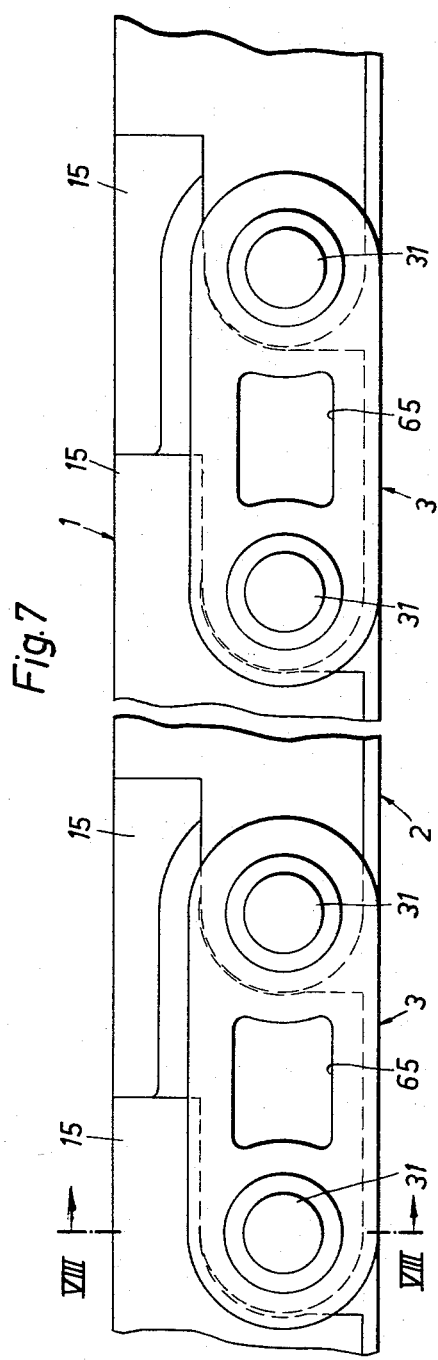
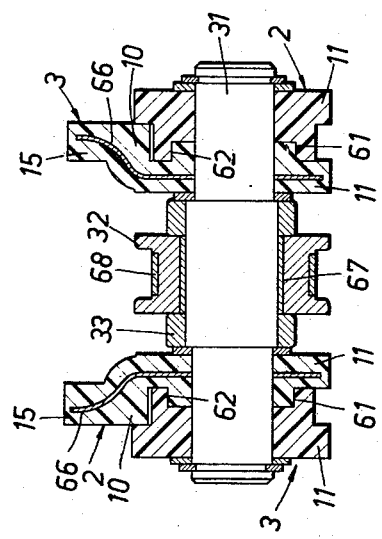
Inventor:
Theo PATRIGNANI
by: Arthur O. Klein
his Attorney

United States Patent Office 3,358,524
Patented Dec. 19, 1967

3,358,524
TRANSMISSION DEVICE
Theo Patrignani, Paris, France, assignor to Manurhin, Mulhouse-Bourtzwiller, Paris, France, a corporation of France
Filed July 6, 1966, Ser. No. 563,284
Claims priority, application France, July 20, 1965, 25,234
10 Claims. (Cl. 74—250)

ABSTRACT OF THE DISCLOSURE

A chain composed of a plurality of pivotally interconnected links which are capable of transmitting loads not only when the links are under tension, as is conventional, but also when the links are under compression.

The load is transmitted from one link to an adjacent one by a pin extending through adjacent and partly overlapping links.

The load is transmitted from pin to pin in a closely similar chain forming part of the "prior art," by way of double thickness of material to a single thickness at one pin of each link which then transmits the load to the other pin of each link from the single thickness to a double thickness and then onto a single thickness of the adjoining link.

This arrangement provides an inherent weakness in the load transmission because of the single thickness which must carry the same load as the double thickness. Consequently the load is transmitted from link to link along a slightly zig-zag path.

This weakness of the "prior art" chain is overcome by providing a chain composed of a plurality of links, each of which is in the form of a one piece body of material formed with a pair of parallel openings passing therethrough and adapted respectively to receive a pair of pins of the chain which serve to pivotally interconnect successive links. The one piece body of each link is preferably made of plastic material which is suitably reinforced.

---

The present invention relates to chains.

In particular, the present invention relates to that type of chain composed of a plurality of pivotally interconnected links which are capable of transmitting loads not only when the links are under tension, as is conventional, but also when the links are under compression.

A chain of this type is disclosed, for example, in U.S. Patent 3,153,940.

As may be seen from the latter, each link is composed of a primary plate portion and a secondary plate portion, the link having a pair of openings for receiving successive pins of the chain which pivotally interconnect the links thereof, and the secondary plate portion of each link is formed with only one of the pin-receiving openings while the primary plate portion is of course formed with both of the pin-receiving openings of each link. The secondary plate portion has a load-transmitting, elongated projection situated beyond the primary plate portion and extending generally in a plane which is parallel to that which includes the axes of the pair of openings of each link, so that when the links are under compression a rear end of one link can transmit a load to a front end of the next link at the projections of the secondary plate portions.

The successive links are arranged with all of the secondary plate portions located in a common plane in a given strand of successive links, while the successive primary plate portions are situated on opposite sides of the common plane which includes the secondary plate portions.

As a result of this construction the pair of pins which pass through a given link are surrounded by a double thickness of the link material, formed by the total thickness of both plate portions, for one of the pins, while the other of the pins is surrounded only by a single thickness corresponding to that of the primary plate portion. Therefore, the load is transmitted from pin to pin by way of a double thickness of material to a single thickness at one pin of each link which then transmits the load to the other pin of each link from the single thickness to a double thickness, and then on to a single thickness of the adjoining link. This arrangement provides an inherent weakness in the load transmission because of the single thickness which must carry the same load as the double thickness, and in addition, because the successive links of a given chain strand have their primary plate portions respectively situated on opposite sides of the common plane which includes the secondary plate portions, this load is transmitted from link to link along a slightly zig-zag path which is also of considerable disadvantage.

It is, therefore, a primary object of the present invention to improve load-transmitting chains of this general type.

In particular, it is an object of the invention to provide a chain structure of the above general type, where the load transmitting surfaces of successive links at the pins which pivotally interconnect the links are of substantially equal area so that it is not necessary to transmit a load between a double thickness and a single thickness of material.

Also, it an object of the present invention to provide a construction where a zig-zag type of load transmission from pin-to-pin is avoided.

In addition, it is an object of the present invention to provide a chain structure which is simple and inexpensive and which, for a given size, is capable of carrying a load greater than a conventional chain of the same size.

A chain constructed according to the present invention is composed of a plurality of links each of which is in the form of a one-piece body of material formed with a pair of parallel openings passing therethrough and adapted respectively to receive a pair of pins of the chain which serve to pivotally interconnect successive links thereof, these openings being situated in the region of the ends of the one-piece body. The one-piece body of each link may be made of plastic which is suitably reinforced, for example, and each one-piece body is composed of a primary plate portion and an integral secondary plate portion which has an elongated projection situated beyond the primary plate portion and extending generally parallel to a plane which includes both of the axes of the openings. Only one of these openings passes through both of the plate portions, the other of the openings passing through only the primary plate portion, and this primary plate portion has, at the latter opening which passes only through the primary plate portion, an annular projection forming an extension of this latter opening and surrounded in part by the secondary plate portion while defining an arcuate groove therewith. At the opening which passes through both plate portions, the secondary plate portion is formed with a recess coaxially surrounding the latter opening and having an inner peripheral surface whose diameter equals the exterior surface of the annular projection, so that the annular projection of one link can be received in the recess of the next link, and in this way the successive links are interconnected not only by ways of the pins which pass through the openings thereof, but also by way of their interfitting projections and recesses. By reason of the projection and recess of each link, the opening which passes only through the primary plate portion is extended while the opening which passes through both plate portions is reduced, and the resulting lengths of openings are maintained the same for both openings of each link, so that each link has a pair of openings of equal length and these openings are in alignment with each other, so that in this way one link will have a load transmitting area equal to the next link at each pin which interconnects a pair of successive links, and in addition a zig-zag type of load transmission will be avoided because of the alignment of the openings of the links.

The invention is illustrated, by way of example, in the accompanying drawings which form part of this application and in which:

FIG. 1 is a side elevation of one possible embodiment of a link according to the present invention, the link of FIG. 1 being shown from that side thereof at which the secondary plate portion is located;

FIG. 2 is an elongated section of the link of FIG. 1 taken along line II—II of FIG. 1 in the direction of the arrows;

FIG. 3 is a transverse section of the link of FIG. 1 taken along line III—III of FIG. 1 in the direction of the arrows;

FIGS. 4–6 are respectively views corresponding to those of FIGS. 1–3, but illustrating a link of the invention which is adapted to cooperate with the link of FIGS. 1–3 and which has its secondary plate portion situated at the side of its primary plate portion which is opposite to the side of the primary plate portion at which the secondary plate portion of the link of FIGS. 1–3 is located, the links of a given chain strand of the invention being successively arranged with the successive links respectively having the structures of FIGS. 1–3, on the one hand, and FIGS. 4–6, on the other hand;

FIG. 7 is a fragmentary side elevation of an assembled chain of the invention; and FIG. 8 is a transverse section of the assembled chain of FIG. 7 taken along line VIII—VIII of FIG. 7 in the direction of the arrows.

Referring now to FIGS. 7 and 8, it will be seen that the chain 1 illustrated therein is composed of a pair of parallel chain strands respectively situated in parallel planes which are spaced from each other and normal to the axis of the pins 31 which interconnect successive links of each chain strand. Each chain strand is constituted by a successive series of links 2 and 3, the structure of the links 2 being shown in FIGS. 1–3, while the structure of the links 3 is illustrated in FIGS. 4–6. These two link structures alternate successively along each strand.

Each link is, in accordance with the invention, composed of a one-piece body of material formed with the pair of openings 12 passing therethrough for respectively receiving the pair of pins 31 which pivotally interconnect successive links. The one-piece body of material of each link is composed of a primary plate portion 11 and a secondary plate portion 10 integral with the primary plate portion. The primary plate portion 11 is of a generally rectangular configuration and has the openings 12 situated adjacent its ends while its outer peripheral end edges extend along parts of circles whose centers coincide with the axes of the openings 12.

Thus, each primary plate portion 11 terminates in a pair of semi-circular end edges coaxially extending around the openings 12.

The secondary plate portion 10 is of a special configuration having an elongated projecting portion 15 extending generally parallel to a plane which includes the parallel axes of the openings 12. The projection 15 has a pair of front load-transmitting edge portions 18 and 24 and a pair of rear load-transmitting edge portions 19 and 25, the rear portions 19 and 25 of one link being adapted to cooperate with the front portions 18 and 24 of the next link for the purpose of transmitting loads in the manner set forth in the above-mentioned U.S. Patent No. 3,153,940.

In accordance with the present invention the one-piece body composed of the plate portions 10 and 11 is preferably molded from a plastic material, and at that opening 12 which passes only through the primary plate portion 11 the link of the invention is provided with an annular projection 61 forming an extension of the opening 12 which passes only through the primary plate portion 11. This projection 61 terminates in an end face which is situated in a plane which is parallel to and passes midway between the opposed side faces of the secondary plate portion 10, so that the projection 61 extends through one half the thickness $e$ of the secondary plate portion 10, as is clearly apparent from FIGS. 1 and 2. This plane in which the end face of the projection 61 is located extends normal to the parallel axes of the openings 12.

At the other end of the link where the opening 12 passes through both of the plate portions, the secondary plate portion 10 is formed with an annular recess 62 having an inner peripheral surface of a diameter equal to the outer diameter of the projection 61, and it will be noted that this recess 62 terminates at its inner end in the same plane as that in which the outer end face of the projection 61 is located, so that the recess 62 also extends through one-half the thickness of the secondary plate portion 10, while being situated on the opposite side of the plane which includes the end face of the projection 61. This recess 62 receives the projection 61 of the next link, so as to act as a support therefor and so as to provide between the links, interconnections in addition to those provided by the pins 31.

It is apparent that the projection 61 increases the length of the opening 12 which extends only through the primary plate portion while the depression or recess 62 decreases the length of the opening 12 which extends through both plate portions, and the result is that both of the openings 12 are of equal length, as is clearly apparent from FIG. 2. Furthermore, it is to be noted from FIG. 2 that since the recess 62 and the projection 61 are situated on opposite sides of the plane which includes the end face of the projection 61, the openings 12 are in alignment with each other, so that a zig-zag type of load transmission will not be provided. Furthermore, because of the equal lengths of the openings 12 each link will have equal load-transmitting areas engaging the pins 31.

It is to be noted from FIG. 1 that the secondary plate portion 10 extends in part around the right opening 12 of FIG. 1, which passes only through the primary plate portion 11, and in addition the projection 61 defines an elongated arcuate groove B with the secondary plate portion 10, and it is this groove which receives the semi-circular end of the secondary plate portion 10 which extends around the outer half of the recess 62 of the next link. The exposed surface portion A shown at the lower right in FIG. 1, together with the groove B, form the weakest part of each link, and it is clear that the projection 61 acts also as a reinforcing rib to strengthen this part of the link.

The link of FIGS. 4–6 is identical with that of FIGS. 1–3 except that the secondary plate portion 10 of the link 3 is situated at that side of its primary plate portion 11 which is opposite from the side of the primary plate portion 11 of the link 2 at which the secondary plate portion of the latter is located.

It will furthermore be noted from FIG. 4, as well as FIGS. 3 and 6 in particular, that at the region where the projection 15 of each secondary plate portion extends beyond the primary plate portion 11, the one-piece body has an elongated portion 64 filling the junction between the primary and secondary plate portions and having a substantially triangular cross section so that in this way also the one-piece body which forms the link of the invention is strengthened. As is apparent particularly from FIG. 4, each primary plate portion 11 is formed with a symmetrical cavity 65.

As is apparent from FIGS. 7 and 8, the links 2 will alternate with the links 3 in the pair of chain strands illustrated, so that all of the secondary plate portions 10 of a given chain strand are situated in a common plane. The manner in which the projections 61 of one link is received in a recess 62 of an adjoining link is shown most clearly in FIG. 8. As is apparent from FIG. 8, each link has at both of its ends load-transmitting surfaces of the same area.

While it is possible to machine each link from a one-piece body of metal, for example, it is preferred to mold the links, for example, by injection molding, from one-piece bodies of plastic.

The plastic bodies are advantageously reinforced. For example, glass fibers may be used for reinforcing purposes, although in FIG. 8 there are illustrated reinforcing elements 66 made of metal.

Between the pair of parallel planes in which the pair of chain strands are located, each pin 31 has, as shown most clearly in FIG. 8, an intermediate portion carrying rollers 33 adapted to cooperate with the chain-advancing sprockets and a guide roller 32 adapted to cooperate with guides which maintain the chain along a given path, as set forth in U.S. Patent No. 3,153,940. The guide rollers 32 are preferably also made of a plastic and their inner surfaces are reinforced by metal sleeves 67, respectively, which respectively surround and directly frictionally engage the pins 31, while the exterior peripheral surface of each plastic guide roller 32 is surrounded and engaged by a friction ring 68 also made of metal.

Of course, the invention is not necessarily limited to the above details from which there may be a considerable departure without going beyond the scope of the invention.

Thus, it will be seen that with the structure of the invention the load-carrying capacity of the link is increased, for example, by the projection 61. Furthermore, the links of the invention reduce the loads on the pins 31 so as to reduce the wearing of these pins. The ends of each link are subjected to the same loads, and the interengagement of the projections 61 respectively with the recesses 62 enable the size of the links to be reduced with respect to a given load which normally would require larger links. Furthermore, the interconnection of the links by way of the projection 61 and recesses 62 greatly facilitates the assembly of the entire chain since the links can be interconnected before the pins 31 are passed through the aligned openings 12 of the successive links.

What I claim is:

1. For use in a chain capable of transmitting loads while the chain is either under tension or under compression, a link consisting of a one-piece body formed adjacent its ends with a pair of openings passing therethrough and respectively having parallel axes, said openings being adapted to receive pins for pivotally connecting a link with adjoining links, said body being composed of a primary plate portion through which both of said openings pass and a secondary plate portion through which only one of said openings passes, said secondary plate portion having an elongated projection extending in the general direction of a plane which includes the parallel axes of said openings, and said projection being situated beyond said primary plate portion, said secondary plate portion extending part of the way around that one of said openings which does not pass through said secondary plate portion, said primary plate portion having at the latter opening, which extends only through said primary plate portion, a circular projection forming an extension of said one opening and situated at the same side of said primary plate portion as said secondary plate portion to define an arcuate groove with the part of said secondary plate portion which extends around said one opening, and said secondary plate portion being formed at the other of said openings with an annular recess having an inner peripheral surface of substantially the same diameter as the outer peripheral surface of said annular projection of said one opening, said secondary plate portion having around at least part of said recess an exterior peripheral edge conforming to the peripheral edge of that part of said secondary plate portion which extends in part around said one opening, whereby a plurality of said links can be arranged in a series with one link having a secondary plate portion on one side of its primary plate portion and the next link having a secondary plate portion on the opposite side of its primary plate portion so that said projections can be received in said recesses for connecting said links to each other by way of connections in addition to those provided by pins which extend through said openings.

2. A link as recited in claim 1 and wherein said openings are of equal length and are aligned with each other.

3. A link as recited in claim 2 and wherein said annular projection terminates in a plane which includes an inner end of said recess and which is normal to the parallel axes of said openings.

4. A link as recited in claim 3 and wherein said plane is situated midway between opposed sides of said secondary plate portion so that said annular projection extends through one half of the thickness of said secondary plate portion on one side of said plane, while said recess extends through one half the thickness of said secondary plate portion on the other side of said plane.

5. A link as recited in claim 1 and wherein said primary plate portion is formed with a cavity situated between its ends and symmetrically arranged with respect to said primary plate portion.

6. A link as recited in claim 1 and wherein said one-piece body is a body of molded plastic.

7. A link as recited in claim 1 and wherein said link is made of a plastic reinforced with glass fibers.

8. A link as recited in claim 1 and wherein said link is made of a plastic reinforced with metal.

9. A chain assembly, for transmitting loads either by pulling or pushing, comprising a pair of strands of interconnected links each of which is composed of a one-piece body of material having primary and secondary plate portions and formed with a pair of openings extending only through said primary plate portion of each link, only one of said openings passing through said secondary portion thereof and said secondary plate portion extending part of the way around the other of said openings of each link and having situated beyond said primary portion an elongated projection extending generally parallel to a plane which includes the axes of both the openings of each link, the primary plate portion of each link having at the other opening which passes only through said primary plate portion an annular projection forming an extension of said other opening and surrounding it in part while being spaced from said secondary plate portion to define with the latter an arcuate groove, while said secondary plate portion is formed with an annular recess at said one opening which passes through both of said plate portions and which has an inner periphery equal in diameter to the diameter of the outer periphery of said annular projection, so that the links of each strand can be interconnected with the annular projection of one link received in the recess of the next link while the successive links alternate with one link having its secondary plate portion on one side of its primary plate portion while the next link has its secondary plate portion on the other side of its primary plate portion, said strands being situated in substantially parallel planes which are spaced from each other, and a plurality of pins, the successive links being interconnected by said pins which pass through the openings of the interconnected links, said pins respectively having intermediate portions situated in the space between the substantially parallel planes in which said strands are situated, and said pins carrying in the space between the latter planes guide rollers for guiding the chain along a given path, said guide rollers being made of a plastic material and having interior friction sleeves which directly surround said pins, respectively.

10. The combination of claim 9, wherein said guide rollers also have exterior metal friction rings surrounding their outer peripheral surfaces and directly engaging said rollers.

References Cited

UNITED STATES PATENTS

| | | | |
|---|---|---|---|
| 623,431 | 4/1899 | Schaefer | 74—255 X |
| 2,882,102 | 4/1959 | Rund | 74—250 X |
| 3,127,980 | 4/1964 | Lanham | 74—250 X |
| 3,137,166 | 6/1964 | Nichols | 74—250 |
| 3,138,236 | 6/1964 | Goodgame | 74—250 X |
| 3,153,940 | 10/1964 | Patrignani | 74—250 |

FRED C. MATTERN, Jr., *Primary Examiner.*

J. A. WONG, *Assistant Examiner.*